(No Model.)

S. G. MASON.
Wagon Axle.

No. 238,299.  Patented March 1, 1881.

Witnesses:
Willy J. E. Schultz
John C. Tunbridge

Inventor:
Sylvester G. Mason
by his attorney
A. v. Briesen

United States Patent Office.

SYLVESTER G. MASON, OF CROWN POINT, NEW YORK, ASSIGNOR TO THE MASON PATENT WHEEL COMPANY, OF SAME PLACE.

WAGON-AXLE.

SPECIFICATION forming part of Letters Patent No. 238,299, dated March 1, 1881.

Application filed July 28, 1880. (No model.)

*To all whom it may concern:*

Be it known that I, SYLVESTER G. MASON, of Crown Point, in the county of Essex and State of New York, have invented a new and Improved Wagon-Axle, of which the following is a specification.

My invention relates to improvements in wagon-axles, and has for its object to supply a strong, durable, and economical axle, which will at the same time have a proper packing for preventing the escape of oil from the box and the entrance of sand, dust, and other gritty material into the box.

My invention consists in providing the axle with a groove which is cut bodily into the axle, and which receives a split ring of leather, as hereinafter described.

Figure 1:
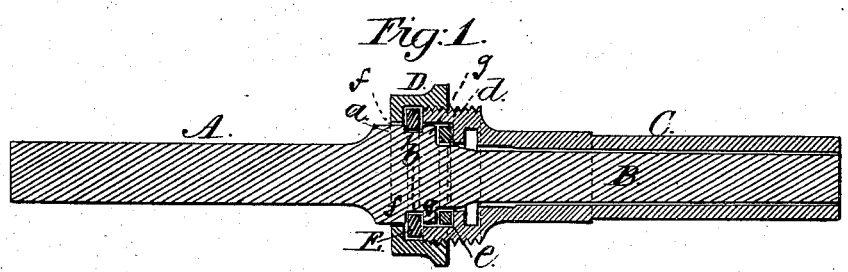
Figure 2:
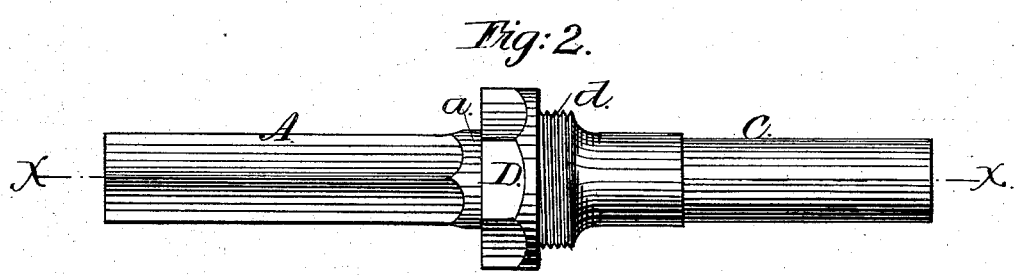
Figure 3:
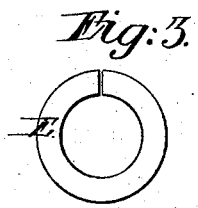

In the accompanying drawings, Figure 1 represents a longitudinal section of one end of my improved axle, taken on line $x\ x$ of Fig. 2. Fig. 2 represents a side elevation of the same, and Fig. 3 represents a detail view of the split ring.

Referring to the drawings, A represents part of a wagon-axle, B being its outer end or spindle for supporting the hub. C is the hub or axle-box. In the shoulder or enlargement $a$, between the body of the axle and the spindle, is cut an annular groove, $b$, so as to leave two flanges, $f$ and $g$, rigid on the axle.

E represents a ring, split open on one side, and made of leather or other suitable material. The ring E is placed in the annular groove $b$, (it being readily opened, so as to permit it to be placed in the said groove $b$,) where it forms a circular flange or feather, as more clearly shown in Fig. 1. When the ring E is so placed the hub or axle-box is slipped over the spindle until the end of its thimble $d$ bears against the adjacent side of the ring E. A cap-nut, D, is now screwed on the thimble $d$ until it is close to or bears against the opposite side of the said ring E. As the ring E is confined in the groove $b$ and is prevented from slipping out of the same by the encircling cap-nut, it has the effect of holding the hub or axle-box on the spindle, at the same time allowing it perfect freedom to rotate on the spindle. The ring E also serves as a packing, and prevents sand, dust, and other gritty substances from getting between the hub and spindle, and also prevents the escape of oil from the spindle.

I am aware that unsplit leather rings have been used on axles; but they required the flange $g$ to be in form of a removable nut. I produce a superior construction in a very economical manner by cutting the groove $b$ bodily into the axle and putting the split ring E into the same.

I am also aware that split rings, as such, are not new, and do not claim the same.

I claim—

The wagon-axle A, having the groove $b$ cut bodily into it to form rigid flanges $f\ g$ of the same piece with said axle, in combination with the split ring E, made in one piece and placed partly into said groove $b$ in such a position that the rear end of the hub will butt against the face of said ring, and with the cap-nut D, substantially as herein shown and described.

SYLVESTER G. MASON.

Witnesses:
CHARLES S. HAMMOND,
GARRISON W. FOOTE.